Feb. 13, 1940.  D. LOVE  2,190,076
LOCOMOTIVE WEDGE BOLT NUT LOCK DEVICE
Filed May 5, 1938
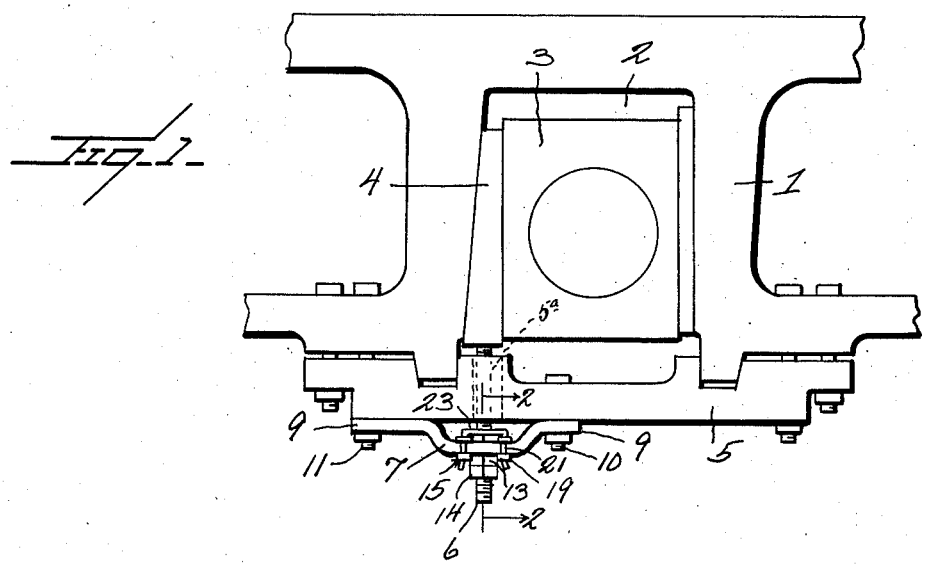
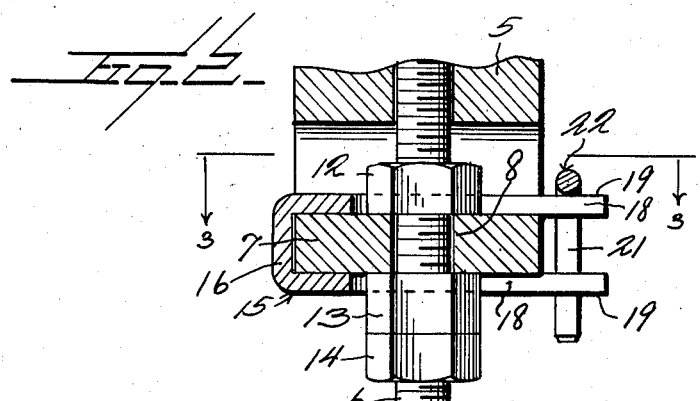
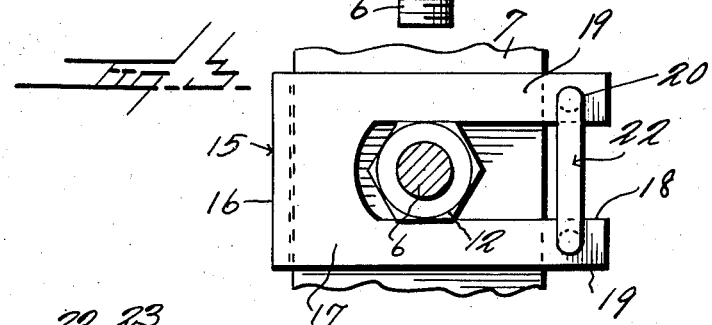
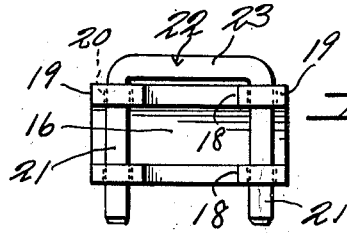
Inventor
Dumont Love
By Watson E. Coleman
Attorney Patented Feb. 13, 1940

2,190,076

UNITED STATES PATENT OFFICE 2,190,076

LOCOMOTIVE WEDGE BOLT NUT LOCK DEVICE

Dumont Love, St. Augustine, Fla.

Application May 5, 1938, Serial No. 206,287

3 Claims. (Cl. 151—57)

This invention relates to improvements in nut locks and pertains particularly to locking means for wedge bolt nuts of locomotives.

The present invention has for its primary object to provide an improved nut lock for bolts employed in locomotives for maintaining the driving box wedge in position whereby the severe vibrations encountered by the engine structure in road service will be ineffective to loosen the nut and the driving box wedge.

Another object of the invention is to provide an improved nut locking means for the specific use above referred to which will be effective and does not require any mutilation of the wedge bolt nut in order that the locking means may be connected therewith.

Still another object of the invention is to provide an improved wedge bolt nut lock securing means which may be installed or removed in a minimum of time and without requiring the use of tools other than a wrench.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in elevation of a portion of a locomotive frame showing the application thereto of the nut lock securing device embodying the present invention, the frame having mounted therein the driving box and securing wedge.

Figure 2 is a section on the line 2—2 of Figure 1.

Figure 3 is a horizontal section on the line 3—3 of Figure 2.

Figure 4 is a view looking at the open end of the nut securing unit, per se, showing the leg connecting member.

Referring now more specifically to the drawing, the numeral 1 generally designates a portion of a locomotive frame having the area 2 for the reception of a driving box 3. Such boxes are secured in position by means of a wedge 4 interposed between a side of the box and an inclined wall of the open area 2, in the manner illustrated and the lower part of the frame has secured thereto the plate 5 which extends across the opening 2 and has a slot 5a through which passes a bolt 6, the upper end of which bolt is securely fastened to the bottom edge of the wedge 4 to maintain the same tightly in position so as to prevent longitudinal movement of the box 3.

The lower face of the plate 5 has an auxiliary plate 7 extending longitudinally thereof across the area through which the bolt 6 passes, this auxiliary plate having an opening 8 for the bolt 6 and having its ends offset as indicated at 9, and secured to the plate by the bolts 10 and 11. The offset ends 9 of the auxiliary plate 7 thus serve to separate the major portion of this plate from the plate 5 providing an area between the two plates for a locking nut 12 which is threaded upon the bolt 6 and bears against the top of the plate 7. Beneath the auxiliary plate 7 are the securing and locking nuts 13 and 14 respectively, which are threaded upon the bolt, the securing nut engaging the bottom side of the plate 7 and the nut 14 serving to lock the securing nut against movement.

The nut securing device embodying the present invention is adapted to engage the nuts 12 and 13, as shown in Figure 2, and this device which is indicated as a whole by the numeral 15 is in the form of a U-shaped clip which is made from a strip of band or plate material which is bent intermediate its ends to form the yoke portion 16 and the spaced parallel legs 17 which are separated sufficiently to snugly receive therebetween the plate 7. Each of the legs 17 is provided with a relatively wide recess 18 opening through its free end and extending longitudinally thereof to form the furcations 19. The recesses 18 are of a width to snugly receive the nuts 12 and 13 so that when the U-shaped clip member is slipped onto the auxiliary plate 7 so that the legs 17 will extend across this plate, the nuts 12 and 13 will be located in the recesses of the legs and held by the furcations 19 against rotation.

The furcations 19 of the two legs 17 are provided with apertures 20 adjacent their free ends and since the length of the legs 17 is materially greater than the width of the plate 7 across which they extend, it will be seen that when the clip is placed on the plate 7 so as to bring the yoke portion 16 against a side edge of the plate, the apertured ends of the furcations of the legs will be disposed beyond the opposite side edge of the plate 7 so that they may receive the leg portions 21 of a substantially U-shaped key 22, the yoke portion of the key, which is indicated by the numeral 23, extending across between the furcations of the top one of the legs 17 so that the ends of the key legs 21 will be directed downwardly. The key legs thus extend across the plate 7 between the furcations of the upper and lower legs of the clip member to prevent withdrawal of the clip member and the accidental displacement of the key may be prevented by bending the lower ends of the leg portions 21 thereof slightly laterally, as shown in Figure 1, so that the key cannot be easily withdrawn.

From the foregoing, it will be readily apparent that the nut securing device herein described is of a character to be easily and quickly placed into or removed from working position and that it is not necessary to alter the construction of or mutilate the nuts 12 or 13 in any manner in order that the nut securing device may be used.

What is claimed is:

1. In locomotive running gear, a bearing wedge bolt passing through two opposed plates and carrying two nuts disposed one above and one below one of the plates, a locking means for the nut lying between the plates consisting of a substantially U-shaped member having a length greater than the width of the said one plate, the legs of the member being spaced to receive said one plate therebetween, each of said legs having a slot formed therein from and opening through the end edge thereof to snugly receive one of said nuts, and means connecting the ends of the legs of the member across the said one plate.

2. In locomotive running gear, a bearing wedge bolt passing through two opposed plates and carrying two nuts disposed one above and one below one of the plates, a locking means for the nut lying between the plates consisting of a substantially U-shaped member having a length greater than the width of the said one plate, the legs of the member being spaced to receive said one plate therebetween, each of said legs having a slot formed therein from and opening through the end edge thereof to snugly receive one of said nuts, and a U-shaped connector between the legs of said member, having two legs and a connecting yoke therebetween, the said member having an aperture through each leg thereof at each side of the slot therein, each leg of said connector passing through alined apertures of the legs of the member.

3. In locomotive running gear, a bearing wedge bolt passing through two opposed plates and carrying two nuts disposed one above and one below one of the plates, a locking means for the nut lying between the plates consisting of a substantially U-shaped member having spaced legs, the legs of the member being sufficiently spaced to receive said one plate therebetween, each of said legs having a slot formed therein from and opening through the end edge thereof to receive one of said nuts, and means connecting the legs of the member together and extending across and securing the member against removal from the said one plate.

DUMONT LOVE.